US010055205B2

(12) United States Patent
Di Balsamo et al.

(10) Patent No.: US 10,055,205 B2
(45) Date of Patent: Aug. 21, 2018

(54) COLLABORATIVE DEVELOPMENT OF SOFTWARE PROGRAMS BASED ON SERVICE INVOCATIONS

(71) Applicant: INTERNATIONAL BUSINESS MACHINES CORPORATION, Armonk, NY (US)

(72) Inventors: Arcangelo Di Balsamo, Aprilia (IT); Marco Morucci, Roma (IT); Sandro Piccinini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/877,016

(22) Filed: Oct. 7, 2015

(65) Prior Publication Data

US 2016/0103662 A1 Apr. 14, 2016

(30) Foreign Application Priority Data

Oct. 10, 2014 (GB) .................................. 1417913.9

(51) Int. Cl.
| | |
|---|---|
| *G06F 9/45* | (2006.01) |
| *G06F 8/36* | (2018.01) |
| *G06F 17/30* | (2006.01) |
| *G06F 8/41* | (2018.01) |
| *G06F 11/30* | (2006.01) |

(52) U.S. Cl.
CPC .............. *G06F 8/36* (2013.01); *G06F 8/4436* (2013.01); *G06F 11/3072* (2013.01); *G06F 17/30657* (2013.01)

(58) Field of Classification Search
None
See application file for complete search history.

(56) References Cited

U.S. PATENT DOCUMENTS

| | | | |
|---|---|---|---|
| 7,739,660 B2 | 6/2010 | Sun | |
| 7,805,702 B2 | 9/2010 | Jacovi et al. | |
| 8,266,585 B2 | 9/2012 | Funt et al. | |
| 8,307,333 B2 | 11/2012 | Peterson | |
| 2009/0158237 A1* | 6/2009 | Zhang | ................... G06Q 10/10 717/100 |
| 2009/0319951 A1* | 12/2009 | Benedetti | ............... G06Q 10/00 715/837 |
| 2010/0333079 A1* | 12/2010 | Sverdlov | .................. G06F 8/52 717/168 |

(Continued)

*Primary Examiner* — S. Sough
*Assistant Examiner* — Timothy Duncan
(74) *Attorney, Agent, or Firm* — Heslin Rothenberg Farley & Mesiti P.C.

(57) ABSTRACT

Assisting a user in developing a software program. A program code of the software program being under development is monitored to identify each code portion of the program code matching a matched one of a plurality of code patterns. A search request is submitted for searching, among a plurality of available services provided by corresponding service providers for the code patterns, each eligible service for the matched code pattern. An indication of at least one eligible service being found is received when a result of the search is positive, prompting the user to select a replacement service among the at least one eligible service in response to the positive result of the search. The code portion is replaced with an invocation of the replacement service on the corresponding service provider.

20 Claims, 7 Drawing Sheets

(56) References Cited

U.S. PATENT DOCUMENTS

| | | |
|---|---|---|
| 2013/0007700 A1 | 1/2013 | Villar et al. |
| 2013/0159960 A1 | 6/2013 | Sivaramakrishnan et al. |
| 2014/0173555 A1 | 6/2014 | Ng et al. |
| 2014/0173563 A1 | 6/2014 | Dias et al. |

\* cited by examiner

COLLABORATIVE DEVELOPMENT OF SOFTWARE PROGRAMS BASED ON SERVICE INVOCATIONS

PRIOR FOREIGN APPLICATION

This application claims priority from United Kingdom (GB) patent application number 1417913.9, filed Oct. 10, 2014, which is hereby incorporated herein by reference in its entirety.

BACKGROUND

Aspects of the present invention relate to the Information Technology (IT) field. More specifically, one or more aspects relate to the development of software programs.

A background is hereinafter introduced with discussion of techniques relating to its context. However, even when this discussion refers to documents, acts, devices and the like, it does not suggest or represent that the discussed techniques are part of the prior art or are common general knowledge in the field relevant to aspects of the present disclosure.

The development of software programs is a very complex activity, especially for large software programs (for example, running in heterogeneous network environments or with multi-tier structures).

For this purpose, several utilities are available for assisting software developers in this activity. For example, an Integrated Development Environment (IDE) provides a single comprehensive environment for several utilities (with similar user interfaces) relating to different tasks of the software development; particularly the IDE may integrate utilities for editing, debugging, compiling/interpreting and deploying the software programs.

With reference in particular to the editing of the software programs, many facilities may be available to assist the software developers. For example, parsing facilities may identify syntax errors as soon as they are introduced, auto-complete facilities may predict commands at the beginning of their typing, and intelligent code completion facilities may suggest completion of commands in the relevant context.

Software reuse is another technique that may be used to assist the software developers, which technique is based on the use of software pieces that are already available for similar purposes. The software reuse may be applied by each software developer individually, at the level of an entire organization (in either an opportunistic or planned way) or by exploiting software pieces provided by third parties. Moreover, the software reuse may be implemented either by actually copying the software pieces into the software programs or by simply referencing them.

Nevertheless, the development of the software programs remains difficult, time-consuming and prone to errors.

This also applies to software programs exploiting services of cloud computing (or simply cloud) environments, wherein the (cloud) services are provided on-demand by cloud providers that provision, configure and release them upon request (completely masking a corresponding implementation); in this case, the software programs may invoke a large number of different cloud services, for example, provided according to the Software-as-a-Service (SaaS) model.

However, the choice of the cloud services to exploit (for example, by searching them in corresponding catalogs) is a manual activity that strongly depends on the skills of the software developers; therefore, very often the cloud services are not exploited (since the software developers may be unaware of them) or they are not exploited at their best (since they are not well-suited for the desired purposes).

SUMMARY

A simplified summary of the aspects of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, an aspect of the present disclosure is based on the idea of replacing one or more portions of the software program with the invocation of corresponding services.

Particularly, an aspect provides a method for assisting a user in developing a software program, wherein a code portion that matches a (matched) code pattern may be replaced with an invocation of a replacement service selected among at least one eligible service that has been found for the matched code pattern (among available services for a plurality of code patterns).

A further aspect provides a computer program for implementing the method (and a corresponding computer program product).

A further aspect provides a corresponding system.

More specifically, one or more aspects of the present disclosure are set out in the independent claims and features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

A solution of aspects of the present disclosure, as well as further features and advantages thereof, will best be understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Various facilities may be available to assist software developers, including, as examples: a code suggestion technique based on a search in a database of past work and problem solving activities; a collaborative development environment wherein a collaboration client is integrated in an IDE—this includes a peer support section to provide access to a collaboration server; and analyzing program code to determine one or more program code design patterns. A knowledge set is generated that includes the determined program code design pattern(s), and that is network-accessible by software development applications to provide program code suggestions for developing software programs. However, the development of software programs remains difficult, time-consuming and error prone.

Figure 1:
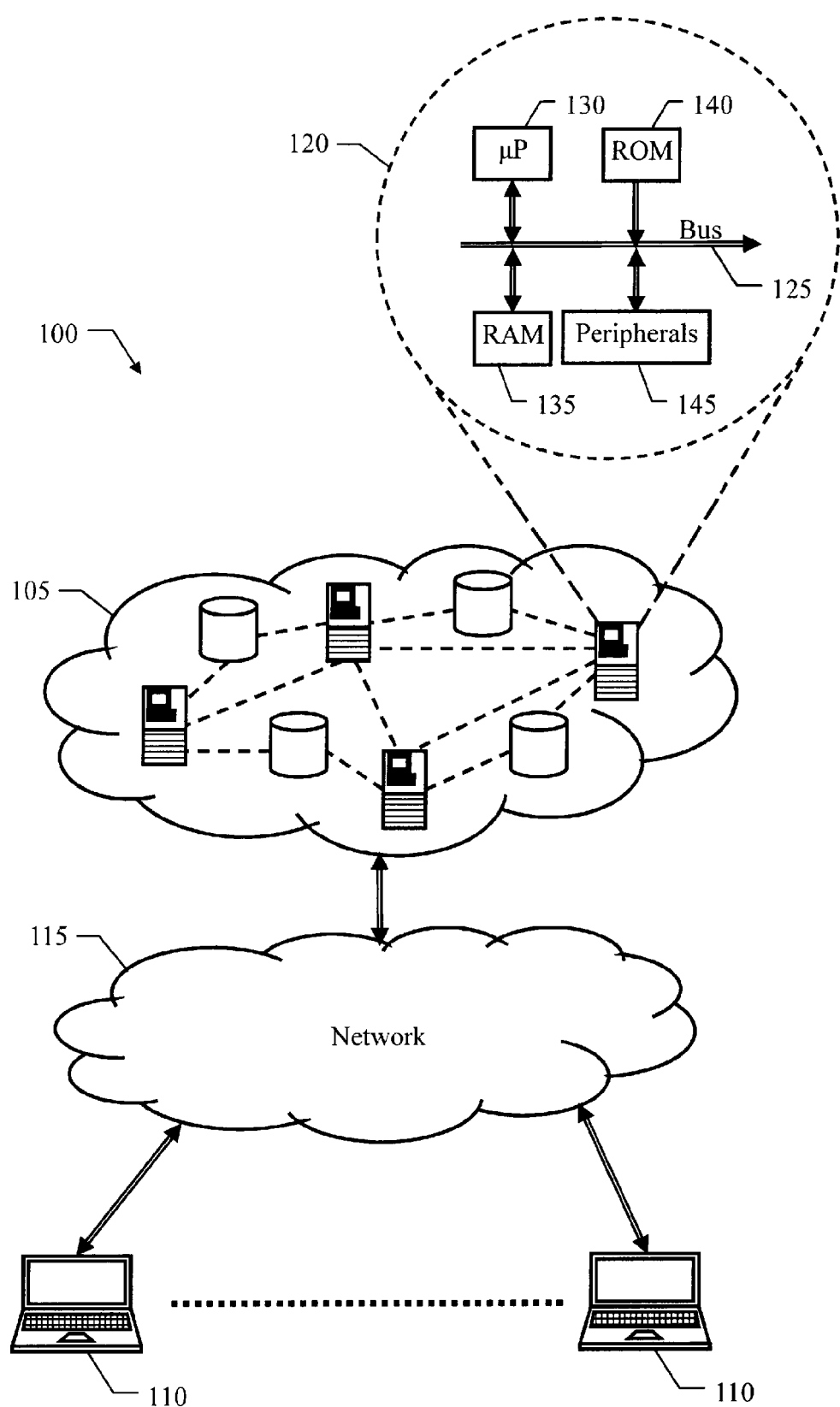
FIG. 1 shows a schematic block diagram of a system wherein a solution according to an embodiment of the present disclosure may be applied.

With reference in particular to FIG. 1, a schematic block diagram is shown of a system 100 wherein a solution according to an embodiment of the present disclosure may be applied.

Particularly, the system 100 implements a cloud (computing) environment (providing cloud resources on demand). The cloud environment 100 may be based on different deployment models, particularly, public cloud (i.e., for the general public), private cloud (i.e., for a single organization), community cloud (i.e., for several organizations) or hybrid cloud (based on a combination of different deployment models).

The cloud environment 100 comprises one or more cloud providers 105 (only one shown in the figure). Each cloud provider 105 is an entity that provides a pool of (computing) resources as cloud services (i.e., shared resources that may be provisioned, configured and released very rapidly); the resources of the cloud services (generally of the virtual type, i.e., emulations by software of physical resources) are provided upon request to users of the cloud provider 105, so that each user has the sole control of these resources (which may then be used exactly as if they were dedicated physical resources). The cloud services may be provided according to several service models, particularly, Infrastructure as a Service, or IaaS (providing computing and storage resources with corresponding management software, such as virtual machines, virtual disks with firewalls, load balancers), Platform as a Service, or PaaS (providing software platforms, such as databases, web servers), Software As a Service, or SaaS (providing software applications, such as e-mail clients, office suites), and Network as a service, or NaaS (providing connectivity services, such as VPNs (virtual private networks), IP (internet protocol) addresses).

The users connect to the cloud providers 105 with corresponding client computing machines, or simply clients, 110 (for example, of the thin type) through a communication network 115; for example, the communication network may be the Internet or a LAN (local area network) when the cloud environment 100 is a public/community cloud or a private cloud, respectively. For this purpose, the cloud provider 105 exposes a front-end component for accessing it (for example, via a web browser of the clients 110) and a back-end component for actually implementing its cloud resources (which back-end component is not accessible from the outside, so that the users are completely agnostic about its location and configuration). For this purpose, the cloud provider 105 owns a pool of (physical) server computing machines, or simply servers, and storage devices organized in one or more server farms (not shown in the figure).

A generic server, denoted with reference 120, is formed by several units that are connected in parallel to a bus structure 125. In detail, one or more microprocessors (g) 130 control operation of the server 120; a RAM (random access memory) 135 is directly used as a working memory by the microprocessors 130, and a ROM (read only memory) 140 stores basic code for a bootstrap of the server 120. Moreover, the server 120 comprises one or more peripherals 145; particularly, the peripherals 145 comprise a mass-memory (implemented by the storage devices of the server farm) and a network adapter (which is used to plug the server 120 in the server farm, also allowing it to communicate with the network 115). A similar structure (suitably scaled) may also be used to implement each client 110.

In the context of aspects of the present disclosure, the users comprise software developers that develop software programs by exploiting a corresponding cloud service of the cloud provider 105 (referred to as a development service). In a solution according to an embodiment of the present disclosure, as described in the following, the service provider 105 further provides a cloud service (referred to as an assisting service) that assists the software developers in developing the software programs by replacing portions thereof with the invocation of corresponding cloud services.

With reference now to FIG. 2A-FIG. 2F, an example application is shown of a solution according to an embodiment of the present disclosure.

Figure 2A:
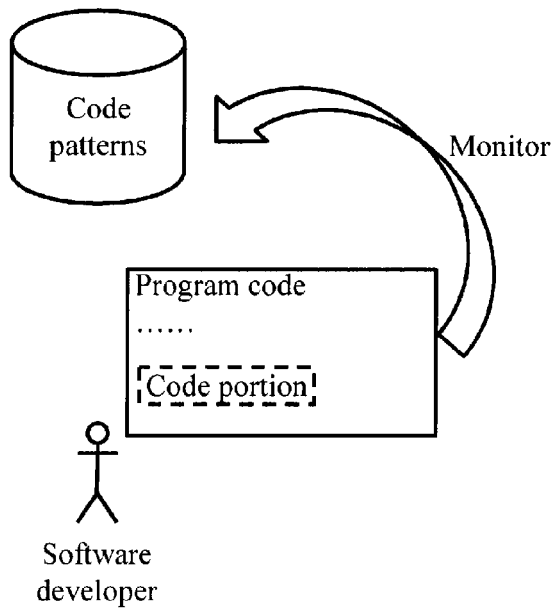
FIG. 2A-FIG. 2F show an example application of a solution according to an embodiment of the present disclosure.

Starting from FIG. 2A, a generic software developer is working on program code of a software program under development (for example, writing it with a corresponding code editor of the development service). The program code is monitored to identify each code portion thereof that matches one of a plurality of code patterns, referred to as a matched code pattern (for example, one or more instructions for transferring files remotely).

Figure 2B:
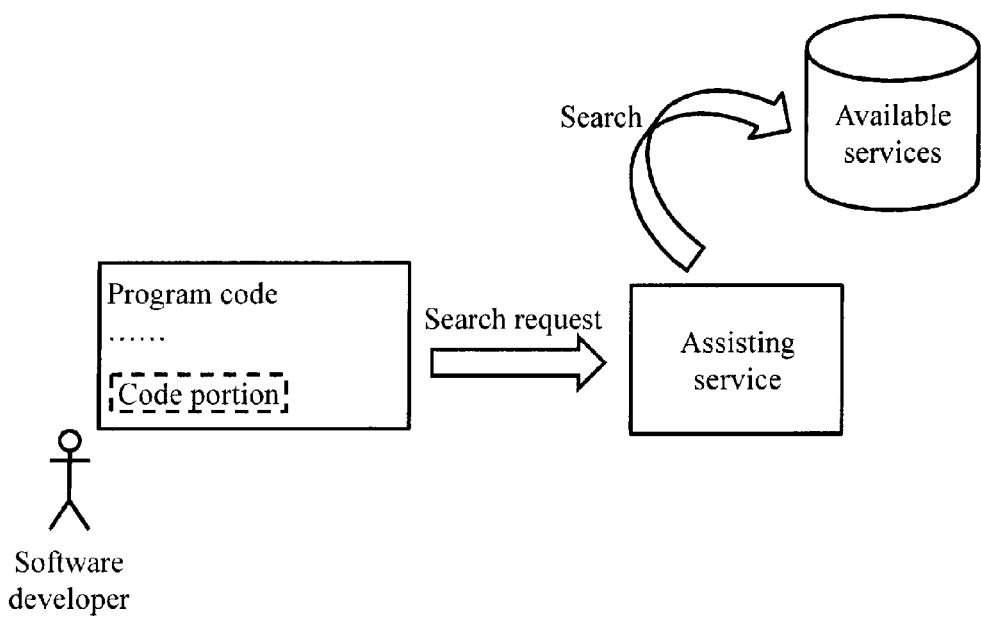

Moving to FIG. 2B, for each code portion that is identified, a search request is submitted to the assisting service. In response thereto, the assisting service performs a search among available cloud services that are provided by corresponding cloud providers (or more generally, among any other available services provided by service providers) for the code patterns (for example, as indicated in a corresponding catalog); the search is aimed at finding each available service for the matched code pattern (referred to as an eligible service), i.e., adapted to implement the same function of the corresponding code portion.

Figure 2C:
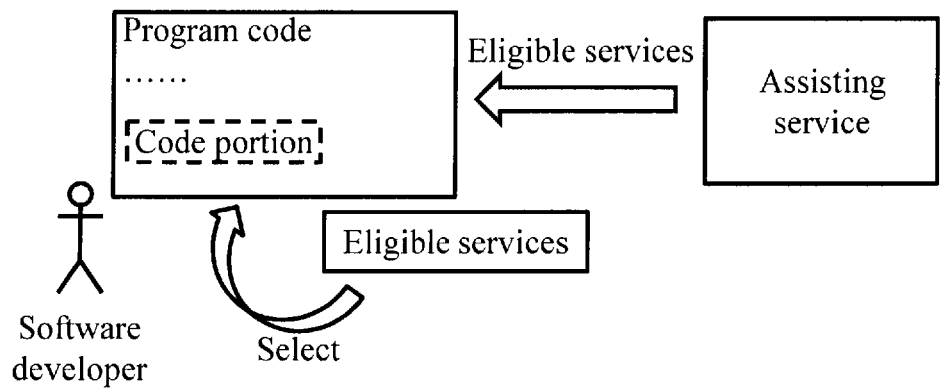

Moving to FIG. 2C, when the result of this search is positive, an indication of the eligible services (one or more) that have been found is received from the assisting service. The software developer is then prompted to select one of the eligible services (for example, in a pop-up window close to the code portion).

Figure 2D:
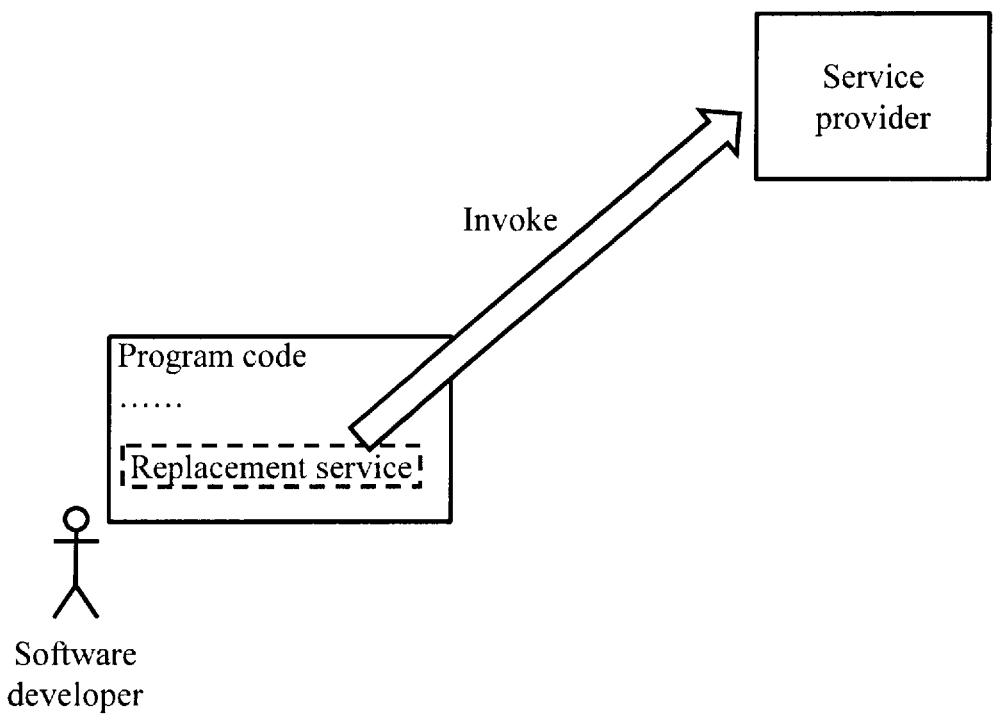

Moving to FIG. 2D, assuming that the software developer selects one of the eligible services, the code portion is replaced with an invocation of this selected eligible service (referred to as a replacement service) on the corresponding service provider.

Aspects of the above-mentioned solution significantly facilitate the development of the software programs, making it faster and more robust.

This improves the visibility of the cloud services (or more generally of any other services) that are available to the software developers. Particularly, the code portions that match the code patterns and the eligible services that are adapted to implement their functions are now determined substantially in an automatic way (and then independently of the skills of the software developers). All of the above fosters the exploitation of the available services at their best (for the desired purposes), with a beneficial effect on the quality of the resulting software programs.

Consequently, it is possible to reduce Capital Expenditures (CAPEX), for IT infrastructures required to develop and run the software programs, in favor of Operating Expenditures (OPEX) thereof; this provides more flexibility and control on the corresponding costs.

Figure 2E:
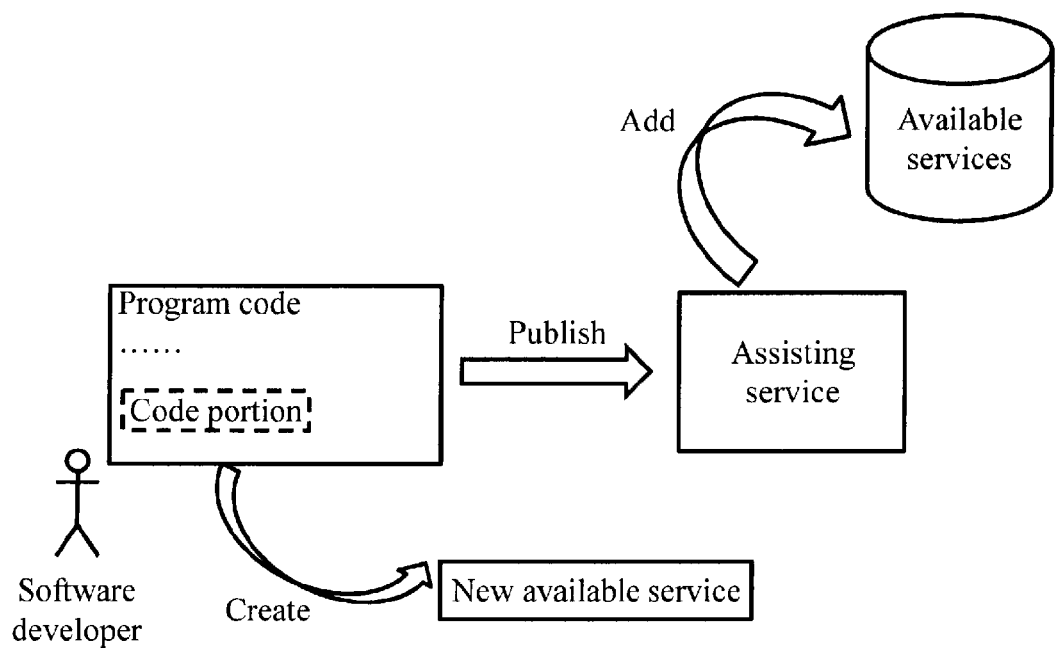

Moving now to FIG. 2E, in a specific embodiment of the present disclosure, when no eligible service has been found a new available service is created for the matched code pattern on a service provider associated with the software developer (for example, in a new Virtual Machine, or VM). The new available service is then published by notifying it to the assisting service for its addition to the other available services.

Figure 2F:
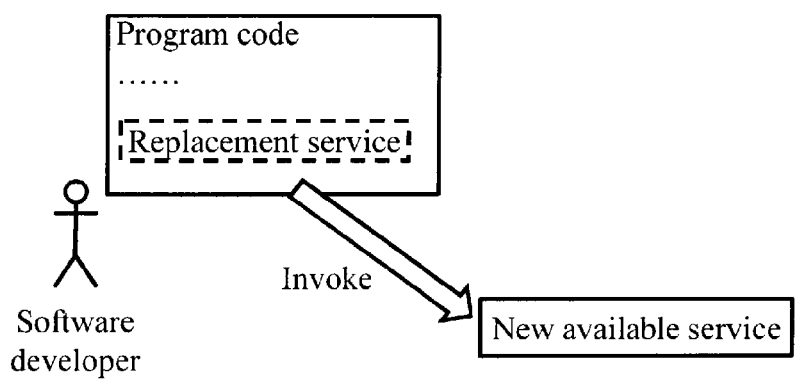

Moving to FIG. 2F, in this case as well, the code portion is replaced with the invocation of (another) replacement service, which is now this new available service.

As a result, (original) code portions may be promoted for their sharing (as available services) among different software programmers in a collaborative way.

Figure 3:
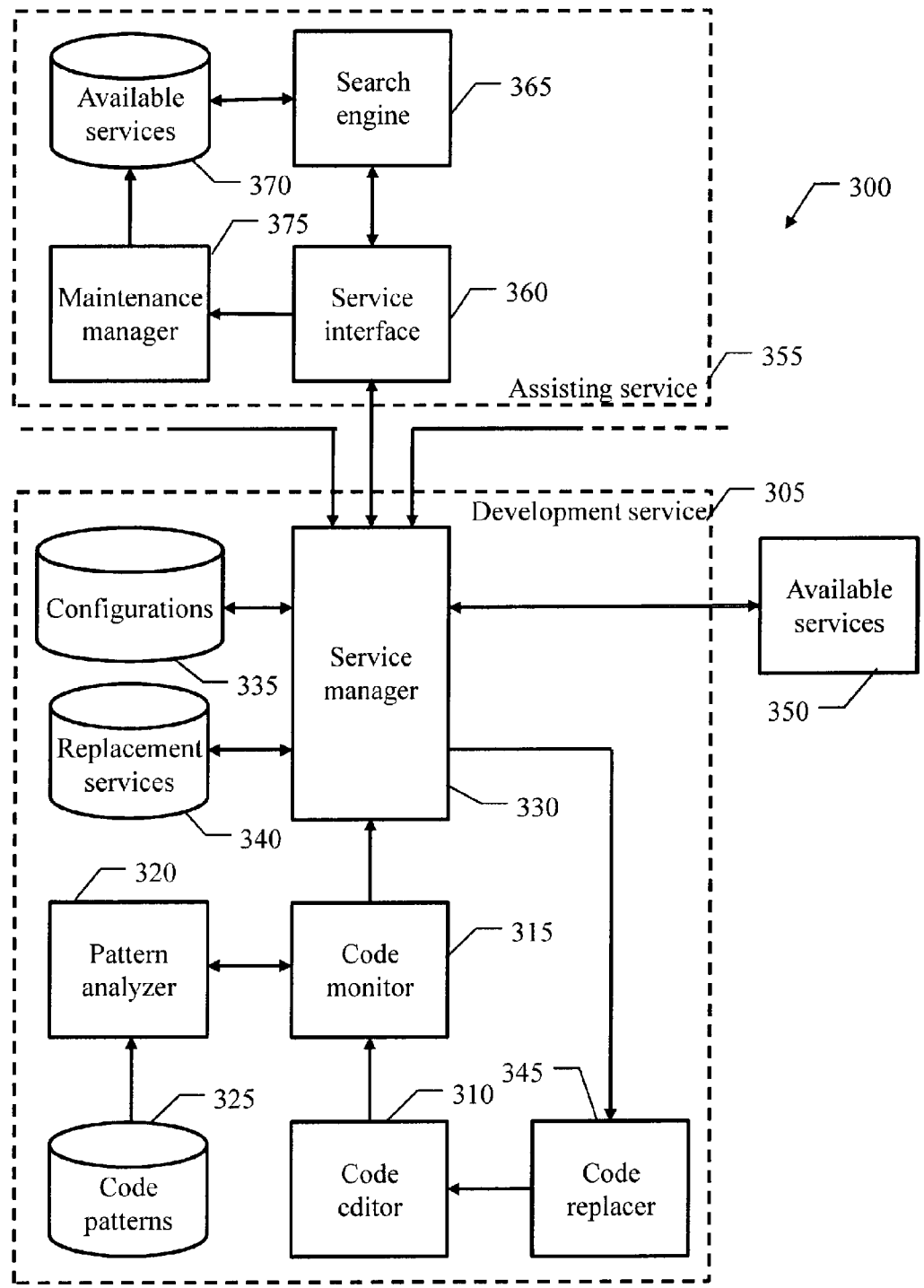
FIG. 3 shows software components that may be used to implement a solution according to an embodiment of the present disclosure.

With reference now to FIG. 3, software components are shown that may be used to implement a solution according to an embodiment of the present disclosure.

The software components (programs and data) are denoted as a whole with reference 300. The software components 300 are typically stored in the mass memory and loaded (at least partially) into the working memory of one or more computing machines (for example, dedicated virtual machines hosted on one or more servers of the cloud provider) when the programs are running The programs are initially installed into the mass memory, for example, from removable storage units or from the communication network. In this respect, each software component may represent a module, segment or portion of code, which comprises one or more executable instructions for implementing the specified logical function.

Particularly, the development service, denoted with reference 305, implements an IDE (integrating different utilities for assisting one or more corresponding software developers in developing software programs). As far as relevant to aspects of the present disclosure, the IDE comprises a code editor 310, which is specifically designed to simplify operations relating to the preparation of program code (i.e., its writing, updating, maintenance) with facilities dedicated thereto (for example, indentation, syntax error identification, autocomplete, intelligent code completion).

In a solution according to an embodiment of the present disclosure, a code monitor 315 interacts with the code editor 310 to monitor the program code of each software program while it is entered. The code monitor 315 in turn exploits a pattern analyzer 320, which analyzes the program code in order to identify its code portions matching the code patterns; for this purpose, the pattern analyzer 320 accesses a code pattern repository 325 that stores a signature of each known code pattern (for example, synchronized with a central version thereof maintained by the assisting service).

The code monitor 315 also interacts with a service manager 330, which manages the replacement services. For this purpose, the service manager 330 controls a configuration repository 335 that stores configuration information of the IDE relevant to this purpose, and a replacement service repository 340 that stores an indication of the replacement services of each software program. The service manager 330 interacts with the code editor 310 through a code replacer 345, which controls the invocation of the replacement services in the program code. The service manager 330 also interacts with each available service, denoted with reference 350, which may be provided by one or more associated service providers (not shown in the figure).

The service manager 330 communicates with the assisting service, denoted with reference 355. Moreover, the service manager 330 communicates with other instances of the same development service for other software developers, and particularly with their service managers (not shown in the figure) for verifying the performance of the replacement services.

Moving to the assisting service 355, it exposes a service interface 360 for the service manager 330 (of all the instances of the development service). The service interface 360 communicates with a search engine 365, which controls the search of the eligible services (for each matched code pattern) among the available services. For this purpose, the search engine 365 accesses an available service repository 370 that stores information about all the available services. A maintenance manager 375 controls the available service repository 370. Particularly, the maintenance manager 375 initializes and periodically refreshes the available service repository 370 by crawling the cloud environment to identify the available services and to collect their characteristics (so that the assisting service 355 operates as an aggregator of the cloud services that are available in the cloud environment); moreover, the maintenance manager 375 is controlled by the service interface 360 for adding any new available service that may be created over time (by every instance of the development service) to the available service repository 370.

Figure 4A:
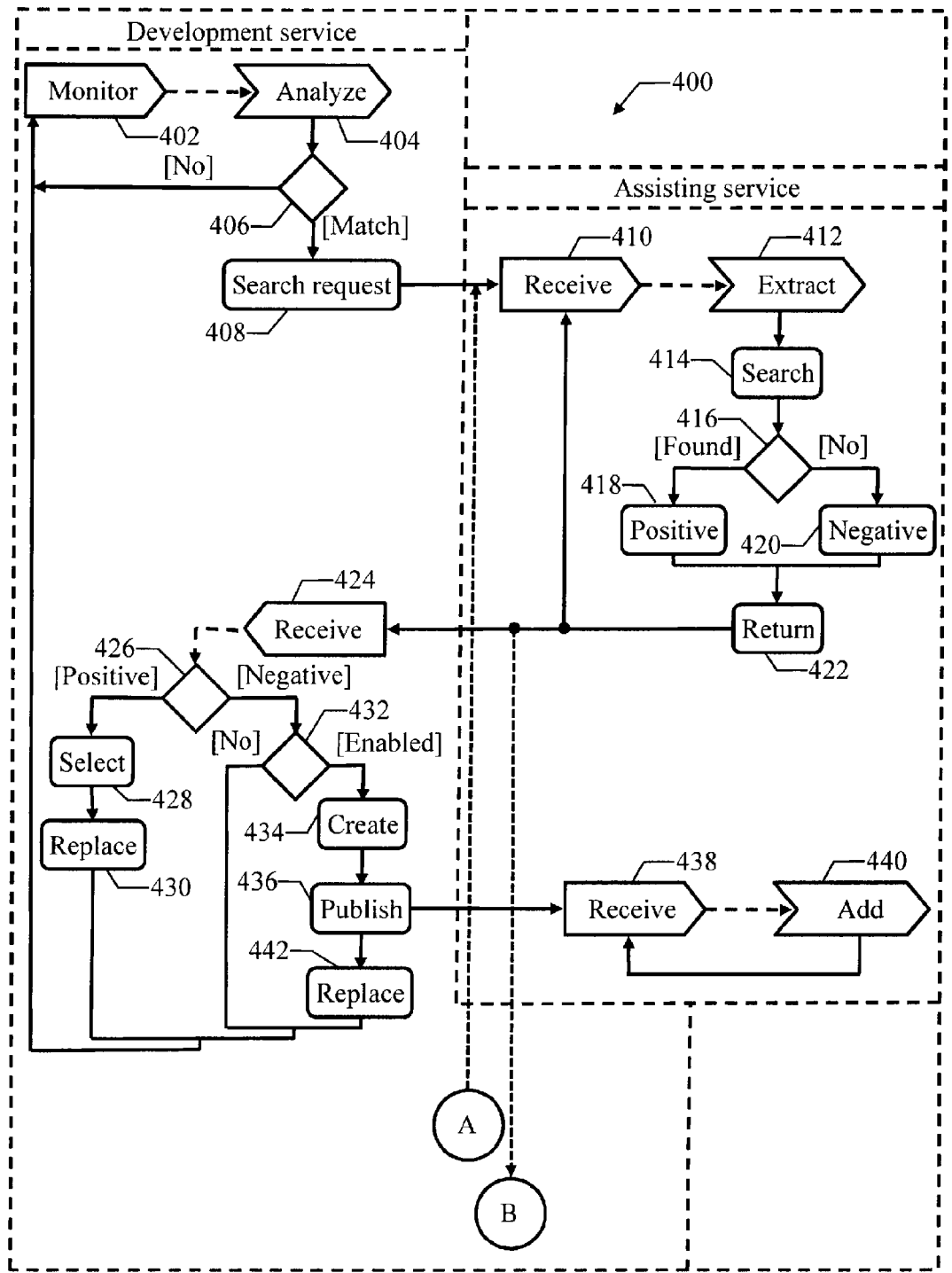
FIG. 4A-FIG. 4B show an activity diagram describing a flow of activities relating to an implementation of a solution according to an embodiment of the present disclosure.
Figure 4B:
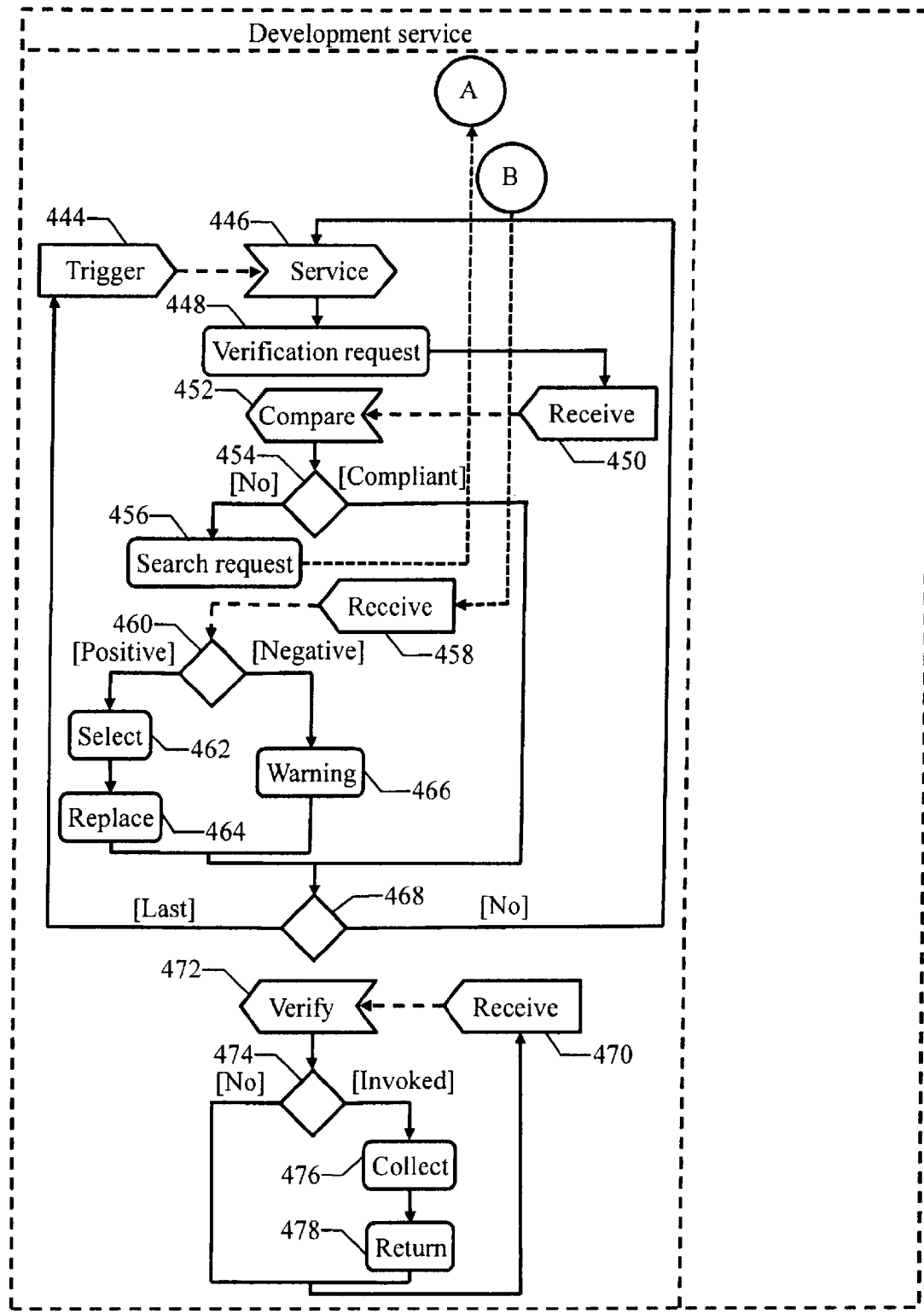

With reference now to FIG. 4A-FIG. 4B, an activity diagram is shown describing a flow of activities relating to an implementation of a solution according to an embodiment of the present disclosure.

Particularly, the diagram represents an example process for assisting software developers in developing software programs with a method 400. In this respect, each block may represent one or more executable instructions for implementing the specified logical function on the relevant computing machine.

With reference to the swim-lane of a generic instance of the development service, the program code of any software program that is under development (by a corresponding software developer) is monitored continuously at block 402. The program code is a source code written in a human-readable, high-level programming language (for example, Java, C++, VisualBasic), which comprises a sequence of statements (each one defined by a line of the program code). A core of the program code is formed by functional instructions (for example, declarations and commands), which define the operations implementing a desired algorithm to be executed by the software program (when the source code is compiled/interpreted into a corresponding object code). Typically, the program code also comprises comments (or remarks), which are text notes added to the instructions to provide explanatory information.

As soon as the entering of a new statement has been detected (because it is either added or updated), the new statement is analyzed at block 404. For this purpose, a code portion (of the program code) comprising the new statement (alone or in combination with one or more other associated statements) is compared with the signatures of the (known) code patterns. For example, in the case of software programs conforming to the Java Enterprise Edition (JEE) specification, the signatures may be defined by corresponding core patterns, such as the use of a "Transfer Object" for transferring information, of a "Data Access Object" for accessing and manipulating data, of a "Session Facade" object for exposing services to remote users. The flow of activity branches at block 406 according to a result of this comparison. If the code portion does not match any one of the code patterns, the process returns to the block 402 to repeat the same operations continuously. Conversely, if the code portion matches one of the code patterns (matched code pattern), a corresponding search request is built and submitted to the assisting service at block 408. The search request comprises an indication of the matched code pattern (for example, a unique identifier thereof). The search request may also comprise additional information for the search of the corresponding available services. Particularly, the search request may comprise an indication of the software developer, which may be retrieved from a log-in thereof in the IDE (for example, at the personal level or at the level of his/her organization/department, with the possible addition of corresponding credentials, such as UserID and password). The search request may comprise an indication of a context of the code portion, which may be inferred from the program code (for example, a low security level for the transfer of information through a LAN or a high security level for the transfer of sensitive information through the Internet). The search request may comprise an indication of a search filter (for the available services), which may be retrieved from the configuration information of the IDE (at the level of each software program, at the level of the software developer individually, for each group thereof, or globally for every software developer using the IDE); for example, the search filter may comprise a filter for one or more performance indicators of the available services (such as acceptable values of Average Response Time, or ART, Mean Time to Failure, or MTF), a filter for the service providers of the available services (such as only belonging to the same organization, to a list of trusted service providers), a filter for a billing schema of the available services (for example, only free of charge).

Moving to the swim-lane of the assisting service, it is listening at block 410 for any search request (from all the instances of the development service). As soon as a search request is received, the process passes to block 412 wherein the information relevant for the search of the corresponding available services is extracted therefrom (i.e., matched code pattern, software developer, context and search filter). Each eligible service for the matched code pattern is then searched accordingly among all the available services at block 414. For this purpose, each available service may be associated with a service profile (either individually or globally at the level of its service provider). The service profile may comprise one or more service policies regulating the invocation of the available service; for example, the service policies may limit the software developers that may invoke the available service (such as only the ones registered with the service provider). In addition or in alternative, the service profile may comprise one or more service characteristics profiling the available service; for example, the service characteristics may comprise the current values of one or more performance indicators of the available service (as above), information about its service provider (such as name, organization), its billing schema (such as free of charge, pay-per-use). The search is based on the matched code pattern (i.e., aimed at identifying any available service adapted to implement the same function of the corresponding code portion). Moreover, the search may also be based on additional criteria. Particularly, the available services may also be searched according to the context of the code portion (for example, by discarding the available services that do not have a high level of security for the transfer of sensitive information through the Internet). The available services may also be searched according to the corresponding service policies; particularly, the available services may be searched according to the matching of their service policies by the software development (for example, by discarding the available services that may not be invoked by the software developer, such as because the developer is not registered with the corresponding service providers). The available services may also be searched according to the search filter of the search request; particularly, the available services may be searched according to the filter for the performance indicators of the available services (for example, by discarding the available services whose average response time or mean time to failure exceed their acceptable values), according to the filter for the service providers of the available services (such as by discarding the available services provided by service providers that do not belong to the same organization of the software developer, that are not comprised in the list of trusted service providers) and/or according to the filter for the billing schema of the available services (for example, by discarding the available services that are not free of charge).

The flow of activity branches at block 416 according to a result of the above-mentioned search. Particularly, if one or more eligible services have been found, the result of the search is set to positive at block 418; the positive result is also associated with a list of the eligible services (for example, ordered according to their degree of matching with the search filter of the search request and comprising an indication of their service policies). Conversely, if no eligible service has been found, the result of the search is set to negative at block 420. In both cases, the flow of activity merges again at block 422 (from either the block 418 or the block 420), wherein the result of the search request is returned to the instance of the development service from which it has been received. The process then returns to the block 410 waiting for a next search request.

Referring back to the swim-lane of the development service, the response to the search request is received from the assisting service at block 424 (by the development service that is listening for it). In response thereto, the flow of activity branches at block 426 according to its content. Particularly, if the response is positive the process descends into block 428. At this point, an indication of the eligible services (extracted from the received response) is displayed (for example, in a pop-up window close to the corresponding code portion, in decreasing order of matching with the search filter and with the possibility of displaying their service policies upon request); the software developer is then prompted to select one of the eligible services. Assuming that the software developer selects one of the available services (replacement service), at block 430 the code portion is replaced in the program code with its invocation (otherwise, no operation is performed).

Referring back to the block 426, if the response is negative a test is made at block 432 to verify whether the publication of the code portion as an available service is enabled (as indicated in the configuration information of the IDE). If so, a new available service for the code pattern is created at block 434 (for example, in a new virtual machine of the cloud environment for the organization of the software developer); the new available service is based on the code portion (which is copied into the new virtual machine after its completion). As soon as the new available service is operative, it is published at block 436 by building a corresponding notification and submitting it to the assisting service; particularly, this notification comprises an indication of the new available service, its code pattern, and a corresponding service profile (extracted from the configuration information of the IDE). Moving to the swim-lane of the assisting service, it is listening at block 438 for the notification of any new available service (from all the instances of the development service). As soon as the notification of a new available service is received, the process passes to block 440 wherein the new available service is added (with its service profile) to the other available services (for example, into the corresponding catalog). The process then returns to the block 438 waiting for a next notification of a new available service. At the same time, in the swim-lane of the development service the process descends from the block 436 into block 442, wherein as above the code portion is replaced in the program code with an invocation of (another) replacement service that is now the new eligible service.

The flow of activity merges again by returning to the block 402 (to repeat the same operations described above continuously) from the block 430 (after the code portion has been replaced with the invocation of the selected eligible service), from the block 442 (after the code portion has been replaced with the invocation of the new available service) or directly from the block 432 (without performing any operation when the publication of the code portion as a new available service is not enabled).

In a completely independent way, the process passes from block 444 (FIG. 4B) to block 446 (in the swim-lane of the development service) as soon as a verification of the replacement services is triggered (for example, periodically such as every day). In response thereto, a loop is performed for verifying the replacement services of the software program; the loop begins by taking into account a (current) replacement service (starting from the first one in any arbitrary order). Continuing to block 448, a corresponding verification request is built and broadcast for all the other instances of the development service that are associated with the assisting service (for example, in the same cloud environment); the verification request comprises an indication of the replacement service to be verified and of the corresponding performance indicators. Continuing to block 450, the development service is listening for any response to the verification request (from the other instances thereof). As soon as a significant number of responses to the verification request (for example, 30-70%) are received from the other instances of the development service, the process passes to block 452 wherein measured values of the performance indicators of the replacement service (being collected by the other instances of the development service as described in the following) are extracted from the responses to the verification request, and they are compared with the corresponding acceptable values (the same as in the corresponding search filter). The flow of activity branches at block 454 according to a result of this comparison. Particularly, if the replacement service is not compliant with the search filter any longer (for example, because its average response time or mean time to failure now exceed the corresponding acceptable values) at block 456 a (further) search request is submitted as above to the assisting service for (further) searching each (further) eligible service, among the available services, for the matched code pattern of this replacement service, referred to as non-complaint service. A response to the search request is received at block 458 from the assisting service (after performing the same operations described above at blocks 410-422) by the development service that is listening for it. In response thereto, the flow of activity branches at block 460 according to its content. Particularly, if the response is positive the process descends into block 462. At this point, an indication of the eligible services (extracted from the received response) is displayed (for example, again in a pop-up window close to the invocation of the non-complaint service in the program code, in decreasing order of improvement of the performance indicators with respect to the non-complaint service and with the possibility of displaying their service policies upon request); the software developer is then prompted to select one of the eligible services as above. Assuming that the software developer selects one of the available services (further replacement service), at block 464 the invocation of the non-complaint service is replaced in the program code with its invocation (otherwise, no operation is performed). Referring back to the block 460, if the response is negative a warning message is provided to the software developer at block 466 (for example, comprising an indication of the shortage of the performance indicators of the replacement service with respect to the acceptable values thereof).

In this way, the performance of the replacement services (and more generally any other characteristics thereof) may be monitored continually. This allows preventing the use of replacement services that may be not suited for their purpose any longer (for example, when they do not allow respecting a prescribed Service Level Agreement, or SLA); particularly, these non-compliant services may be replaced with more suitable eligible services (when available) or with dedicated program code otherwise (which may also be promoted as a new available service as above).

The flow of activity merges again at block 468 from either the block 464 or the block 466; the same point is also reached directly from the block 454 (without performing any operation) when the replacement service is still compliant with the search filter. At this point, a test is made to verify whether a last replacement service has been taken into account. If not, the process returns to the block 446 to repeat the same operations described above for a next replacement service. Otherwise, once all the replacement services have been taken into account, the process returns to the block 444 waiting for a next triggering of the verification of the replacement services.

In a completely independent way, the development service is listening at block 470 for any (further) verification request of a replacement service of other instances of the development service. As soon as this verification request is received, a verification is made at block 472 to determine whether this replacement service is invoked by one or more software programs of the development service. The flow of activity then branches at block 474 according to a result of this verification. If the replacement service is invoked, the measured values of the performance indicators of the replacement service are collected at block 476 (for example, as registered over time by the replacement service itself that is specifically instrumented for this purpose). With reference now to block 478, a response to the verification request is built (by adding an indication of the measured values of the performance indicators of the replacement service) and returned to the other instance of the development service from which it has been received. The process then returns to the block 470 waiting for a next verification request; the same point is also reached directly from the block 474 (without performing any operation) when the replacement service is not invoked in any software program of the development service.

In this way, the verification of the replacement services is achieved in a completely collaborative way among the software developers (independently of both the assisting service and their service providers).

Modifications

Naturally, in order to satisfy local and specific requirements, a person skilled in the art may apply many logical and/or physical modifications and alterations to aspects of the present disclosure. More specifically, although aspects of this disclosure have been described with a certain degree of particularity with reference to one or more embodiments thereof, it should be understood that various omissions, substitutions and changes in the form and details as well as other embodiments are possible. Particularly, different embodiments of aspects of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise) and the term means for (or any means-plus-function formulation) should be intended as any entity or structure adapted or configured for carrying out the relevant function.

For example, an embodiment provides a method for assisting a user in developing a software program. The method comprises the following. A program code of the software program (which is under development) is monitored to identify each code portion of the program code that matches a matched one of a plurality of code patterns. A search request is submitted for searching (among a plurality of available services provided by corresponding service providers for the code patterns) each eligible service for the matched code pattern. An indication of at least one eligible service that has been found is received when a result of the search is positive. The user is prompted to select a replacement service among the at least one eligible service in response to the positive result of the search. The code portion is replaced with an invocation of the replacement service on the corresponding service provider.

However, the program code may be monitored in any way (for example, at the level of its instructions, subroutines). The code patterns may be in any number and of any type (even not known a priori). The code portion may have any length (for example, from single instruction to whole subroutines) and its code pattern may be identified in any way (for example, with machine learning, clustering, neural network techniques) and according to any matching (for example, of keywords in comments, even anticipating the completion of the corresponding code portion). The search request and the corresponding result may be of any type (see below). The available services may be in any number and of any type (for example, File Transfer Protocol, or FTP, services for moving files, encryption services for securing information, authentication services for validating credentials). The eligible services may be searched among the available services in any way (see below). The replacement service may be selected in any way among the eligible services (for example, automatically according to predefined rules, with the user that is only prompted to accept it). The code portion may be replaced with the invocation of the replacement service in any way (for example, by maintaining it in the software program as a comment).

In an embodiment, the method further comprises adding a new one to the available services for the matched code pattern in response to a negative result of the search (when no eligible service has been found); the new available service is based on the code portion. The code portion is replaced with an invocation of another replacement service being the new available service.

However, the new available service may be created in any way (see below) and it may be added to the available services in any way (for example, by creating a corresponding new community); the new available service may be based on the code portion in any way (for example, by encrypting it).

In an embodiment, the adding a new one to the available services comprises creating the new available service on one of the service providers associated with the user, and publishing the new available service.

However, the service provider may be associated with the software developer in any way (for example, a shared service provider for a corresponding community); moreover, the new available service may be published in any way (for example, by the service provider). In any case, the possibility of creating the new available service in a different way (for example, directly by the assisting service) is not excluded.

In an embodiment, the submitting a search request comprises associating the search request with an indication of a context of the code portion; each eligible service is searched among the available services further according to the context of the code portion.

However, the context of the code portion may be defined in any way (for example, for different categories of server farms, different operating systems, different hardware architectures). The context of the code portion may be associated with the search request in any way (for example, entered manually), or it may be missing at all.

In an embodiment, each available service is associated with a service policy; each eligible service is searched among the available services further according to the corresponding service policies.

However, the service policies may be of any type (see below). The service policies may be associated with the available services in any way (for example, globally at the level of the assisting service).

In an embodiment, the submitting a search request comprises associating the search request with an indication of the user; each eligible service is searched among the available services whose service policies are matched by the user.

However, the user may be associated with the search request in any way (for example, according to the client from which the search request is received). Each service policy may be matched by the user in any way (for example, limiting the invocation of the available services to the same cloud environment, organization, community, geographical area). In any case, the service policy may be based on different, additional or alternative constraints (for example, only for non-commercial use), or it may be missing at all.

In an embodiment, the submitting a search request comprises associating the search request with an indication of a search filter for the available services; each eligible service is searched among the available services further according to the search filter.

However, the search filter may be defined in any way (see below). The search filter may be associated with the search request in any way (for example, entered manually).

In an embodiment, the search filter comprises an indication of a filter for a billing schema of the available services by the corresponding service providers.

However, the filter for the billing schema may be based on any number and type of constraints (for example, fry-and-buy).

In an embodiment, the search filter comprises an indication of a filter for the service providers of the available services.

However, the filter for the service providers may be based on any number and type of constraints (for example, a minimum value of their reputation provided by a feedback mechanism).

In an embodiment, the search filter comprises an indication of a filter for one or more performance indicators of the available services.

However, the performance indicators may be in any number and of any type (for example, bandwidth, workload) and the corresponding filter may be based on any number and type of constraints (for example, a maximum acceptable value of their average shortage).

In any case, the search filter may comprise different, additional or alternative constraints (for example, a selected theme of the available services, such as banking, energy saving, a minimum acceptable rating of the available services provided by a feedback mechanism, a minimum number of other users already invoking the available services), or it may be missing at all.

In an embodiment, the method further comprises the following. A compliance is verified of each replacement service with the corresponding search filter, in order to identify the replacement service as a non-compliant service when the replacement service is not compliant with the corresponding search filter. A further search request is submitted for further searching (among the available services) each further eligible service for each non-compliant service. An indication of at least one further eligible service that has been found for each non-compliant service is received when a result of the corresponding further search is positive. The user is prompted to select a further replacement service among the at least one further eligible service of each non-compliant service whose result of the corresponding further search is positive. An invocation of each further replacement service is inserted in place of the invocation of the corresponding non-compliant service into the program code.

However, the compliance of each replacement service with the corresponding search filter may be verified in any way (see below). In this case as well, the further search request and the corresponding result may be of any type, the further eligible services may be determined in any way, the further replacement service may be selected in any way, and the invocation of the further replacement service may be inserted in place of the invocation of the non-compliant service in any way (see above).

In an embodiment, the verifying a compliance of each replacement service comprises the following operations. A verification request for verifying the performance indicators of the replacement service is submitted to one or more further users. An indication of measured values of the performance indicators of the replacement service is received from at least part of each further user invoking the replacement service. The measured values of the performance indicators of the replacement service are compared with the corresponding search filter. The method further comprises the following. A further verification request for verifying the performance indicators of a replacement service of one of the further users is received therefrom. The measured values of the performance indicators of the replacement service of the further user are collected when invoked by the user. An indication of the measured values of the performance indicators of the replacement service of the further user are returned thereto.

However, the verification request may be submitted in any (for example, to the assisting service that distributes it to all the users or only to the ones invoking the replacement service) and the measured values of the performance indicators of the replacement service may be received in any way (for example, through the assisting service, either individually or in aggregated form). The measured values of the performance indicators of the replacement service may be compared with the search filter in any way (for example, by deeming the replacement service not compliant only when the measured values of a minimum number of further users exceed the acceptable values, only after this persists for a predefined period). In this case as well, the further verification request may be received in any way and the measured values of the performance indicators of the replacement service of the further user may be returned in any way (see above). The measured values of these performance indicators may be collected in any way (for example, continually or only upon request).

In any case, the verification of the compliance of each replacement service with the corresponding search filter may be based on different, additional or alternative information (for example, the current rating and/or usage thereof, the current reputation of its service provider). More generally, this verification may be implemented in different ways. For example, the verification may be implemented by the assisting service (according to the up-to-date service characteristics of the replacement service); in addition or in alternative, it is also possible to refresh the replacement services by submitting a corresponding request to the assisting service, which verifies whether other available services may be preferred to each one of them (so as to suggest its replacing).

In an embodiment, the method is implemented in a cloud environment.

However, the operations described above may be distributed in any way between the development service and the assisting service; for example, it is possible to move the analysis of the code portions to the assisting service (in which case the corresponding search request will comprise an indication of the code portion instead of its matched code pattern), to move the search of the eligible services to the development service (in which case the search request and the corresponding response will be within it). Moreover, the same operations may be performed on each client in part (for example, by leaving the search of the eligible services to the assisting service only) or entirely (for example, by downloading a local version of the catalog of the available services). In any case, the same method may be implemented in any other environment (for example, a traditional client/server environment).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment provides a computer program, which is configured for causing a computing system to perform the steps of the above-described method. A further embodiment provides a computer program product comprising a non-transitory computer readable medium embodying a computer program, which computer program is loadable into a working memory of a computing system thereby configuring the computing system to perform the same method.

However, the computer program may be implemented as a stand-alone module, as a plug-in for a pre-existing software program (for example, an IDE), or even directly in the latter. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon. Any combination of one or more computer readable medium (s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A further embodiment provides a system comprising means configured for performing the steps of the same method.

However, the method may be performed on any system. The system may be based on a different architecture (for example, a local, wide area, global, cellular or satellite network), and it may exploit any type of (wired and/or wireless) connections. However, the implementation of the method on a stand-alone computer is not excluded. In any case, each computing machine used to implement the method may have another structure or may comprise similar elements; moreover, it is possible to replace the computing machine with any code execution entity, based on either a physical machine or a virtual machine or any combination thereof.

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

What is claimed is:

1. A computer-implemented method of assisting a user in developing, a software program, the computer-implemented method comprising:

monitoring a program code of the software program being under development to identify a code portion of the program code matching a code pattern of a plurality of code patterns;
submitting a search request for searching, among a plurality of available services provided by corresponding service providers for the plurality of code patterns, each eligible service for the matched code pattern;
receiving an indication of at least one eligible service being found when a result of the search is positive;
prompting the user to select a replacement service among the at least one eligible service in response to the positive result of the search;
replacing the code portion with an invocation of the replacement service on the corresponding service provider; and
adding a new available service to the available services for the matched code pattern in response to a negative result of the search when no eligible service has been found, wherein the adding comprises automatically creating a new computing resource to provide the new available service.

2. The computer-implemented method according to claim 1, the new available service being based on the code portion, the method further comprising:
replacing the code portion with an invocation of another replacement service being the new available service.

3. The computer-implemented method according to claim 2, wherein the adding the new available service to the available services comprises:
creating the new available service on one of the service providers associated with the user; and
publishing the new available service.

4. The computer-implemented method according to claim 1, wherein said submitting the search request comprises:
associating the search request with an indication of a context of the code portion, each eligible service being searched among the available services further according to the context of the code portion.

5. The computer-implemented method according to claim 1, wherein each available service is associated with a service policy, each eligible service being searched among the available services further according to the corresponding service policies.

6. The computer-implemented method according to claim 5, wherein said submitting the search request comprises:
associating the search request with an indication of the user, each eligible service being searched among the available services whose service policies are matched by the user.

7. The computer-implemented method according to claim 1, wherein said submitting the search request comprises:
associating the search request with an indication of a search filter for the available services, each eligible service being searched among the available services further according to the search filter.

8. The computer-implemented method according to claim 7, wherein the search filter comprising an indication of a filter for a billing schema of the available services by the corresponding service providers.

9. The computer-implemented method according to claim 7, wherein the search filter comprises an indication of a filter for the service providers of the available services.

10. The computer-implemented method according to claim 7, wherein the search filter comprises an indication of a filter for one or more performance indicators of the available services.

11. The computer-implemented method according to claim 10, further comprising:
verifying a compliance of each replacement service with a corresponding search filter to identify the replacement service as a non-compliant service when the replacement service is not compliant with the corresponding search filter;
submitting a further search request for further searching, among the available services, each further eligible service for each non-compliant service;
receiving an indication of at least one further eligible service being found for each non-compliant service when a result of the corresponding further search is positive;
prompting the user to select a further replacement service among the at least one further eligible service of each non-compliant service whose result of the corresponding further search is positive; and
inserting an invocation of each further replacement service in place of the invocation of the corresponding non-compliant service into the program code.

12. The computer-implemented method according to claim 11, wherein said verifying the compliance of each replacement service comprises:
submitting a verification request for verifying the performance indicators of the replacement service to one or more further users;
receiving an indication of measured values of performance indicators of the replacement service from at least part of each further user invoking the replacement service; and
comparing the measured values of the performance indicators of the replacement service with the corresponding search filter;
and wherein the method further comprises:
receiving a further verification request for verifying the performance indicators of a replacement service of one of the further users therefrom;
collecting the measured values of the performance indicators of the replacement service of the further user when invoked; and
returning an indication of the measured values of the performance indicators of the replacement service of the further user thereto.

13. The computer-implemented method according to claim 1, wherein the method is implemented in a cloud environment.

14. A computer program product for assisting a user in developing a software program, the computer program product comprising:
a non-transitory computer readable storage medium readable by a processing circuit and storing instructions for execution by the processing circuit for performing a method comprising:
monitoring a program code of the software program being under development to identify a code portion of the program code matching a code pattern of a plurality of code patterns;
submitting a search request for searching, among a plurality of available services provided by corresponding service providers for the plurality of code patterns, each eligible service for the matched code pattern;
receiving an indication of at least one eligible service being found when a result of the search is positive;

prompting the user to select a replacement service among the at least one eligible service in response to the positive result of the search;

replacing the code portion with an invocation of the replacement service on the corresponding service provider; and adding a new available service to the available services for the matched code pattern in response to a negative result of the search when no eligible service has been found, wherein the adding comprises automatically creating a new computing resource to provide the new available service.

15. The computer program product according to claim 14, the new available service being based on the code portion, wherein the method further comprises:

replacing the code portion with an invocation of another replacement service being the new available service.

16. The computer program product according to claim 14, wherein said submitting the search request comprises:

associating the search request with an indication of a context of the code portion, each eligible service being searched among the available services further according to the context of the code portion.

17. The computer program product according to claim 14, wherein said submitting the search request comprises:

associating the search request with an indication of a search filter for the available services, each eligible service being searched among the available services further according to the search filter.

18. A computer system for assisting a user in developing a software program, the computer system comprising:

a memory; and a processing device in communication with the memory, wherein the computer system is configured to perform a method, said method comprising:

monitoring a program code of the software program being under development to identify a code portion of the program code matching a code pattern of a plurality of code patterns;

submitting a search request for searching, among a plurality of available services provided by corresponding service providers for the plurality of code patterns, each eligible service for the matched code pattern;

receiving an indication of at least one eligible service being found when a result of the search is positive;

prompting the user to select a replacement service among the at least one eligible service in response to the positive result of the search;

replacing the code portion with an invocation of the replacement service on the corresponding service provider; and adding a new available service to the available services for the matched code pattern in response to a negative result of the search When no eligible service has been found, wherein the adding comprises automatically creating a new computing resource to provide the new available service.

19. The computer system according to claim 18, new available service being based on the code portion, wherein the method further comprises:

replacing the code portion with an invocation of another replacement service being the new available service.

20. The computer system according to claim 18, wherein said submitting the search request comprises:

associating the search request with an indication of a context of the code portion, each eligible service being searched among the available services further according to the context of the code portion.

* * * * *